United States Patent Office 3,611,681
Patented Oct. 12, 1971

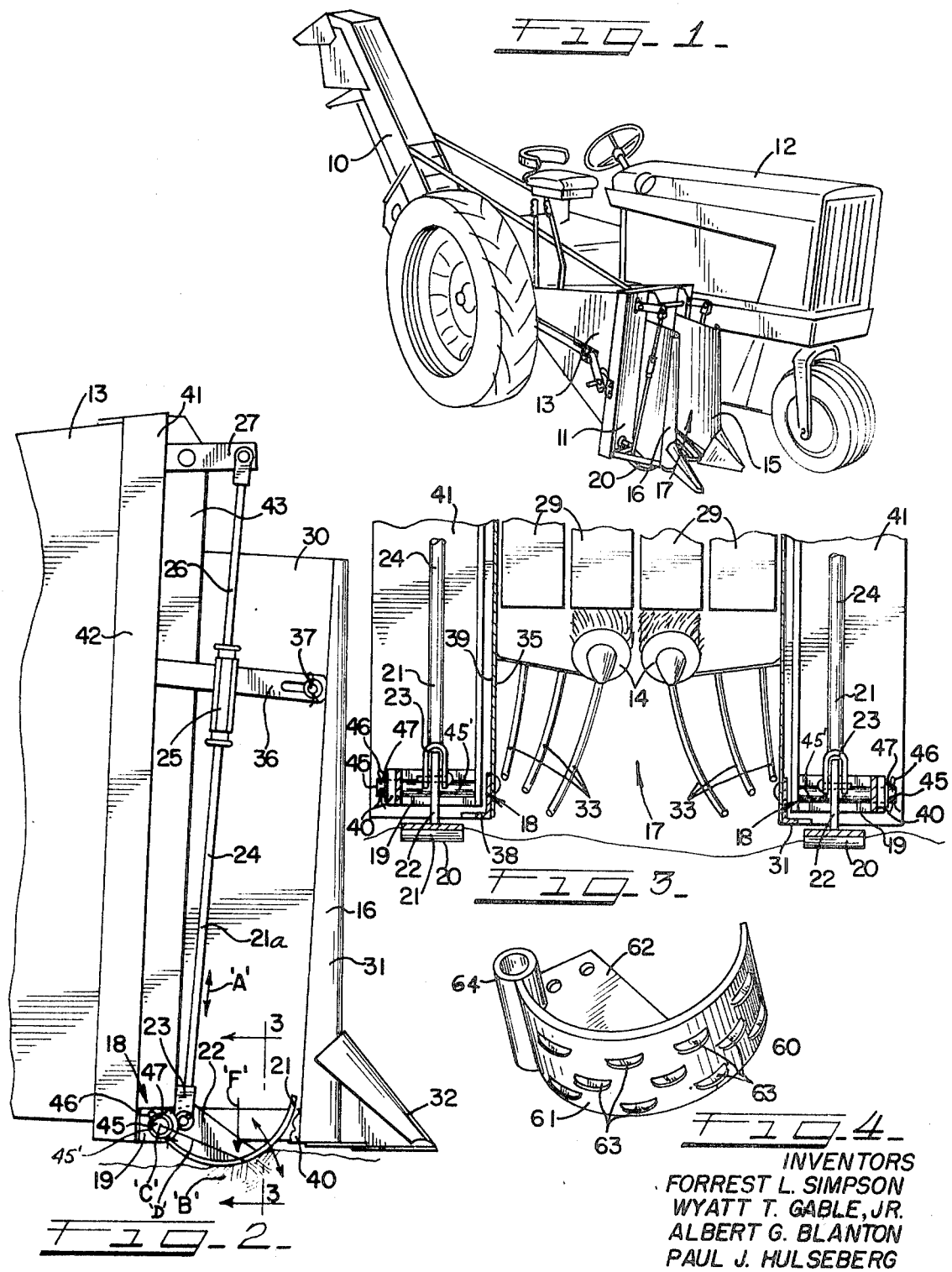

3,611,681
AUTOMATIC UNIT HEIGHT CONTROL FOR COTTON HARVESTER
Albert G. Blanton, Wyatt T. Gable, Jr., Paul J. Hulseberg, and Forrest L. Simpson, Memphis, Tenn., assignors to International Harvester Company, Chicago, Ill.
Filed Nov. 24, 1969, Ser. No. 879,052
Int. Cl. A01d 45/18
U.S. Cl. 56—10.4                8 Claims

ABSTRACT OF THE DISCLOSURE

A ground contour sensing shoe for use with a system to automatically control the height of a harvesting unit movably mounted on a field-going carrier, the shoe having a pivotal connection to the harvesting unit and including a drag producing area of engagement with the ground which is located forwardly and below that connection to provide during operation a moment of rotation about the connection effecting a bias of the shoe toward the ground at the area of engagement to make the shoe less responsive to minor variations in soil texture and surface irregularities without substantially effecting its responsiveness to ground contour.

BACKGROUND OF THE INVENTION

In conventional harvesting machines having a harvesting header or device it is becoming common to provide automatic systems for controlling the height of the harvesting device or header to thereby maintain it at a predetermined harvesting height relative to the ground in order to optimize the efficiency of the harvesting operation.

The harvesting device is often hinged to the frame of the harvesting machine and is raised and lowered by a hydraulic system actuated in accordance with variations in ground contour. Usually variations of the contour of the ground is sensed by ground engaging elements, such as shoes or rods, which are mounted on the harvesting device in a manner to press upon the ground and be positionally displaced responsive to variation in its surface profile.

One of the problems encountered in such a method of sensing variations of ground contour is that minor diversity in soil texture and surface irregularities are also detected and transferred to the hydraulic system resulting in spurious indications of changes in basic contour of the ground. Such indications at times cause the hydraulic system to oscillate and operate unnecessarily. In order to avoid this problem some manufactures provide a dwell region in the system. This has the disadvantage of making the system less responsive to sudden changes in ground contour. Others have mechanically biased the ground riding contour sensing element toward the ground by spring loading, or the like, which has the obvious disadvantage forcing the element into the ground notwithstanding soil texture or conditions. This situation is aggravated when a field has soft and muddy sections; for it can be appreciated that an adjustment of mechanically bias element which would operate properly on a firm portion of a field would "dig-in" at soft portions with attendant undesirable consequences.

It is a general object of the invention to provide a ground contour sensing element for use on a harvesting machine having a height control system for automatically positioning a harvesting device or header at a predetermined distance above the ground.

A still further object is to provide a ground contour sensing element articulatively mounted on the harvesting device and having a ground engaging area coacting with the ground to produce frictional and shear forces which act upon the sensing element to produce a moment of rotation about the articulated mounting to effect biasing the sensing element into the ground at the area of engagement.

A still further object of the foregoing is to provide that the area of engagement be disposed forwardly and below the location articulating mounting and in spaced relation thereto, and arranged in such a manner that the moment of rotation acts in an upright plane substantially aligned with the direction of travel.

BRIEF DESCRIPTION OF THE DRAWINGS

FIG. 1 is a tractor mounted cotton harvesting machine with an automatic height controlled harvesting unit;

FIG. 2 is a fragmentary elevational view of the harvesting unit with parts cut away and with the ground contour sensing element attached thereto;

FIG. 3 is a fragmentary sectional view of the harvesting device taken substantially at line 3—3 of FIG. 2; and FIG. 4 is a fragmentary view of an alternate embodiment of a ground sensing shoe.

DESCRIPTION OF THE PREFERRED EMBODIMENT

Referring now to FIG. 1, the reference character 10 designates a conventional cotton harvesting machine comprising a harvesting unit or header 11, mounted on a tractor 12, and having a powered automatic lifting system (not shown) for elevating and lowering the harvesting unit 11 relative to variations in ground contour to prevent gouging of the earth and also to maintain the units at a predetermined height with respect to the crop to provide optimum efficiency in the harvesting process.

While the instant invention is disclosed herein as being adapted to a cotton harvester, and more particularly to a cotton stripper, it will be understood that the invention is applicable to other harvesting machines having headers for collecting crop and especially such crops as they are planted in rows.

The stripping header 11 of a conventional cotton harvester comprises a structural housing 13 for mounting cotton stripping rolls 14 and other associated mechanisms for stripping both lint cotton and green bolls from the cotton plants.

A pair of gathering shields, generally designated 15, 16 are disposed on the forward end of the housing 13 and arranged to symmetrically flank a crop row. The housing 13 has a forwardly facing crop ingress opening 17 located between the gathering shields and is protectively covered by a plurality of flexible tongues 29 swingably mounted in juxtaposed arrangement across the opening partially covering the stripping rolls 14 mounted therein. Each of the gathering shields are pivotally mounted to the housing 13 by a connection generally designated 18 and are positioned to flank the opening 17 thereby providing a chute to guide the plants therein.

In the instant invention, a ground contour sensing element, designated 20 is swingably connected to the housing 13 at that same connection 18.

It ca be seen in FIG. 3 that, in the particular embodiment disclosed, each stripping units utilizes a pair of signal-transmitting contour sensing elements 20 and associated linkage generally designated 21, arranged on each side of the opening 17. It should be understood that the gathering shield 16, sensing element 20 and associated linkage 21a arranged on one side of the opening 17 is substantially identically in make-up to the corresponding arrangement incorporating the gathering shield 15 on the other side of the opening, therefore in the following description for one side will be applicable and descriptive of the other side, and where such duplicate structure is shown the same reference numerals will be used to designate such duplications.

Turning attention to FIGS. 2 and 3 it can be seen that the gathering shield 16 comprises an upright side wall 30 merging into an arcuate front portion 31. A plant lifting shoe 32 is mounted on the lower extent of the arcuate front portion 31 of the shield and extends forwardly therefrom and serves to lift the lowermost branches of the cotton plant during harvesting operations preparatory to the stripping operation by the header 11. An arrangement of plant guiding rods 33 are connected to the outward face 35 of the lower portion of the upright wall 30 of the gathering shield and serves to continue the plant lifting operation of the shoes and guide the plants to the center of the opening 17 to a position between the stripping rolls 14. As hereinbefore mentioned the plant shield 16 is pivotally connected to the header 11 at the connection 18. Forward pivotal motion of the shield is restrained by slotted bracing arm 36 slidably connected to the upper portion of the wall 30 by pin and cotter pin arrangement designated 37. An angle member 38 is fastened to the shield 16 along the lower inner face 39 of the side wall 30 and extends from the header 11 to the front arcuate portion 31 and provides a rigid member on which the shield 16 is pivotally supported. A rigid arm 40 flanking the angle member 35 and arranged in spaced relation thereto extends forwardly from the pivot connection 18 to a fixed connection on the front arcuate portion 31 of the shield 16.

Mounted on each side of the open 17 of the header is a structural Z shaped member 41 having a rearwardly extending flange 42 and a forwardly extending flange 43. The pivotal connection 18 comprises a perforated bracket 19 which is securely mounted on the lower portion of the Z shaped member 41 adjacent the rigid arm 40 and includes a pin 45 which freely slides through and is rotatably retained by suitably aligned holes through the lower portion of the wall 30, angle member 38, front flange 43, bracket 19 and rigid arm 40, as best seen in FIG. 3. The pin 45 is retained laterally in position by a washer 47 and locking pin 46. It can be appreciated from the above description that the forward flange 43 and the bracket 19 pivotally support the gathering shield 16 in such a manner to provide a pivoting movement of the shield about the connection 18 within the restraining limits of the slotted arm 36.

The ground contour sensing element 20 comprises wide arcuate member 21 having a longitudinal center rib 22 connecting thereto and a pivot tube 45'. The sensing element is disposed adjacent the wall 30 and behind the arcuate portion 31 of the gathering shield. The rear extent of the rib 22 is securely affixed to the tube 45' by welding with the pin 45 rotatably extending there through. It can be seen that both the gathering shield 16 and the contour sensing element 20 are both pivotally mounted at the same pivotal connection 18. Just forwardly of this connection the linkage 21a is pivotally connected to the rib 22 of the sensing element by a stirrup connector 23. The linkage comprises a rod segment 24 connected to the connector 23. The rod segmet 24 extends upwardly and connects to an adjustment coupling 25 which in turn is connected to another rod segment 26 pivotally connected to a rocker arm assembly 27. The rocker arm assembly is connected by means of suitable linkage to the automatic lifting system which is operative to elevate and lower the harvesting header 11 in sustantially immediate response to the pivoting motion of the rocker arm assembly 27 which is actuated by pivoting motion of the ground sensing element 20 by means of the linkage 21a as indicated by arrow A as the sensing element rides upon the ground and follows the contour thereof. In this manner variations in ground contour are transmitted to the automatic lift means in order that it may maintain the header 11 at predetermined height above the ground notwithstanding variations in ground contour.

It can be seen in FIG. 2 that the arcuate member 21 engages the ground at a location designated by the shaded area B. It can be seen that this area is disposed forward and below a point C about which the sensing element 20 is constrained to pivot. During operation of the harvester the sensing element 20 is pushed along and through soil and a portion of the arcuate member 21 engages the soil at an area of engagement at the region of the shaded area B. As the member 21 rides along the soil it slightly plows into the soil tending to push a small mound soil ahead of it. As this is done two rearwardly directed forces act upon the member 21 at the area of engagement. One rearward force is produced by friction due to the engagement with the ground. The other force is produced by shear forces caused by a shearing of the soil by the member 21 at the area of engagement as it plows through the surface of the soil. Because the point of pivot C is located a distance D rearwardly and above in spaced relation to the area of engagement a moment is created about that point by the aforementioned rearwardly directed forces. This moment has the effect of producing a force indicated by an arrow F having a substantially downward direction at the area of engagement. This force F biases the element into soil at the area of engagement without using mechanical biasing wherein the sensing element is less responsive to slight variations in the texture and surface of the soil. Furthermore it can be appreciated that when the harvester comes upon a muddy section in the field the friction and shear forces acting upon the sensing element will be reduced considerably, thus automatically reducing the force F biasing the areas of engagement into ground to allow the sensing element 20 to virtually skim across the muddy section and thereby automatically compensating for such a condition; for when mechanical biasing is used, ground riding sensing elements have a tendency to be forced ito the soft and muddy soil causing incorrect height indications with the attendant danger that the drum will gouge the ground.

FIG. 4 illustrates a fragmentary view of another embodiment of a ground sensing element designated 60. This sensing element has a wide, arcuate member 61 connected to a rib portion 62 with a pivot tube 64 welded thereto, and being substantially identical in construction to the ground sensing element 20 here before described. However a plurality of calks 63 have been secured to the underside of the arcuate member 61. These calks 63 serve to increase the frictional and shear forces acting upon the sensing element during operation to thereby increase the biasing force F as ground and field conditions require. By controlling the size and number of such calks fastened to the underside of the arcuate member 61, a ground sensing element can be adopted to operate with predictable stability over a variety of soil textures and conditions.

It will be appreciated that the embodiment of the invention chosen for the purposes of illustration and description herein is that preferred based upon requirements for achieving the objects of the invention and developing the utility thereof in the most desirable manner, due regard being had to existing factors of economy, simplicity of design and construction, production methods and the improvement sought to be effected. It will be understood, that the particular structure and functional aspect emphasized herein are not intended to exclude but rather to suggest such other modifications and adaptation as fall within the spirit and scope of the invention as defined in the appended claims.

What is claimed is:

1. In a harvester having a mobile frame with a harvesting unit mounted on such frame for adjustment of its elevation thereon, said harvester having an intended direction of travel and including lift means operative in response to actuation of a signal-receiving component thereof to adjust the elevation of said harvesting unit on said frame; the improvement comprising a connecting pivot mounted on said harvester unit, ground contour sensing means having a signal-transmitting element swingably mounted on said pivot mount and operably disposed with respect to said signal-receiving component to cause the lift means to effect harvester unit elevation correlated with the attitude at which said element is swung relatively to its mount, said element having a drag-producing area being disposed for engagement with and for riding on said ground and coacting therewith to produce a force on said element, said drag-producing area being disposed with respect to said direction of travel in spaced relation forwardly of and below said pivot mount to define a moment arm operated on by said force to produce a moment or rotation upon said element for biasing said drag-producing area to press against the ground to modulate changes in the attitude at which the signal-transmitting element is swung responsively to minor variations in ground contour.

2. The invention according to claim 1 and said harvesting unit having a forwardly facing portion, plant guiding means mounted on that portion and extending forwardly therefrom; said plant guiding means having a space open toward the ground and shielded from above ground plants and debris, and said element of said ground sensing means operatively disposed within said space to insulate said element from interference from said plants and debris.

3. The invention according to claim 1 wherein said signal-transmitting element of said ground sensing means comprises a broad ground-sensing shoe having an arcuate longitudinal extent defining a wide downwardly facing undersurface with upturned ends, said mount to said harvester pivotally mounting one of said ends thereto wherein said other end is swingably disposed in leading relation relative the direction of travel to said mounted end and said drag producing area of engagement lying along said downwardly facing surface in spaced relation forwardly and below said mount.

4. The invention according to claim 3 wherein said ground sensing shoe includes drag increasing means on said under surface of said shoe along the area of engagement.

5. The invention according to claim 4 wherein said drag increasing means comprises a plurality of calks projecting from said undersurface along said area of engagement.

6. The invention according to claim 2 wherein said element of said ground sensing means comprises a wide ground sensing shoe having a arcuate longitudinal extent defining a broad downwardly facing undersurface terminating at upturned ends, one of said ends being pivotally connected to the forward facing portion of said harvesting unit and swingably disposing said shoe within said space wherein said other upturned end is disposed forwardly of said mount.

7. The invention according to claim 6 wherein said ground sensing shoe includes drag increasing means on said undersurface along the area of engagement.

8. The invention according to claim 6 wherein said plant guiding means having a pivotal mounting connection serving as a mounting to said forward portion of said harvester unit, and the connections of said ground sensing shoe and said plant guiding means having a common mounting bracket mounted on said harvesting unit.

References Cited

UNITED STATES PATENTS

| | | | |
|---|---|---|---|
| 2,674,075 | 4/1954 | Snow | 56—11 |
| 2,700,857 | 2/1955 | Stearman | 56—208 XR |
| 2,851,841 | 9/1958 | Aber et al. | 56—11 XR |
| 2,972,847 | 2/1961 | Matthews, Jr. | 56—11 |
| 3,417,553 | 12/1968 | Hubbard | 56—208 XR |

ROBERT PESHOCK, Primary Examiner

J. A. OLIFF, Assistant Examiner

U.S. Cl. X.R.

56—208, DIG 15